United States Patent Office 2,727,612
Patented Dec. 20, 1955

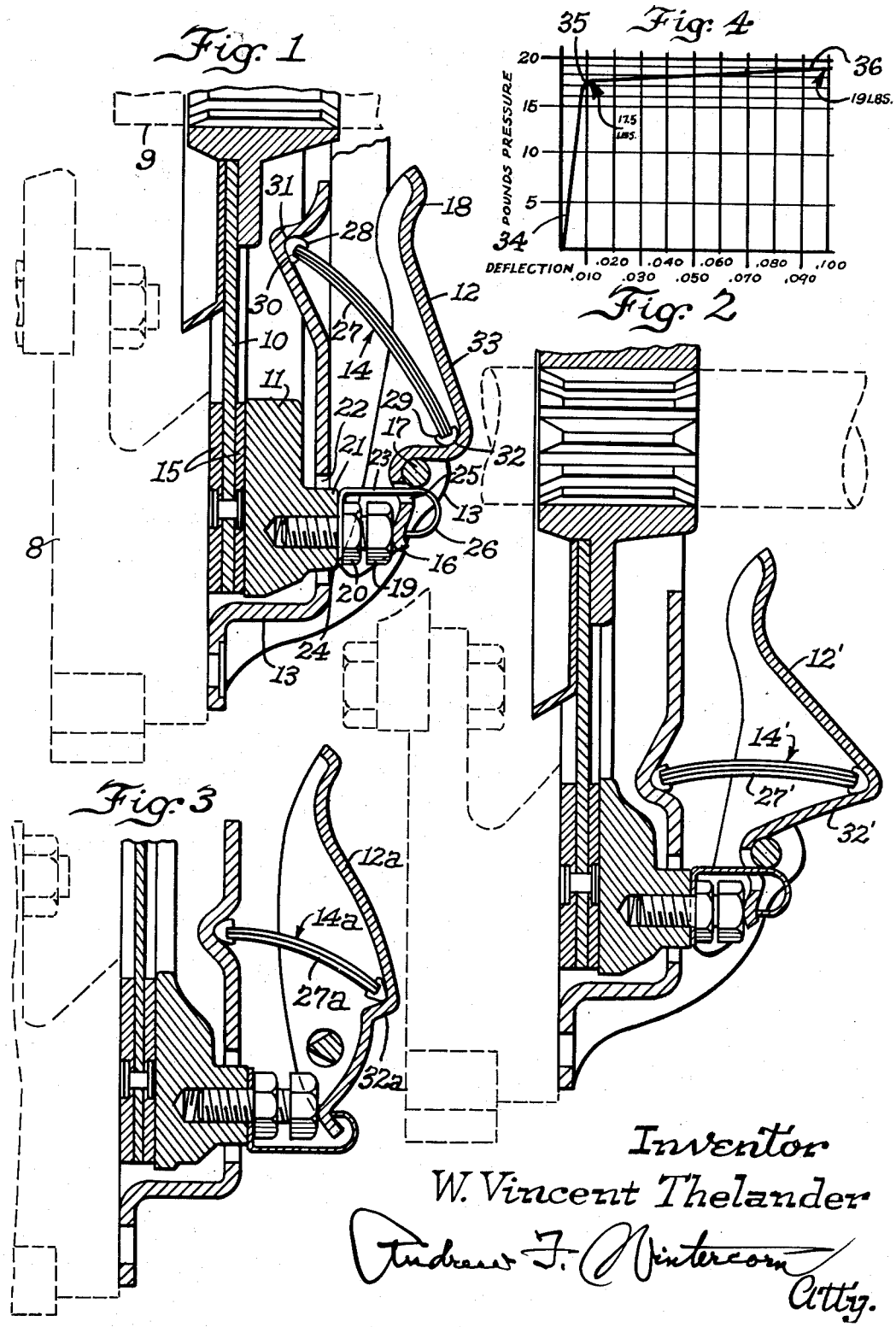
Dec. 20, 1955 — W. V. THELANDER — 2,727,612
FRICTION CLUTCH
Filed Nov. 13, 1951
Inventor
W. Vincent Thelander

2,727,612

FRICTION CLUTCH

W. Vincent Thelander, Toledo, Ohio, assignor to Dana Corporation, Toledo, Ohio, a corporation of Virginia Application November 13, 1951, Serial No. 255,885

10 Claims. (Cl. 192—99)

This invention relates to friction clutches for use in motor vehicles and is more particularly concerned with improvements in spring-loaded type clutches of the kind disclosed in Patent 1,985,301, issued December 25, 1934, to Carl A. Thelander and me.

The salient feature of the clutch in that patent is the provision of spring-loaded levers pivoted near their outer ends on supports and arranged to apply the engaging spring pressure at the outer ends to the pressure plate in such leverage relationship to the point of application of spring pressure to the levers that the spring pressure obtained for clutch engagement is multiplied through the levers, the levers, however, being arranged to be operated by foot pedal pressure applied through a throwout collar to the inner ends of the levers in such leverage relationship to the point of application of spring pressure to the levers that another mechanical advantage is obtained through the levers so as to decrease the pedal pressure needed for disengagement of the clutch. In that earlier clutch, as in various others of subsequent designs using the same principle, coiled compression springs are employed for spring loading of the levers. The build-up rate of such springs, as is well known, is high. Consequently, the pedal pressure required for disengagement, especially in the larger sizes, is appreciable despite the mechanical advantage obtained. Wear and tear on the throwout bearing is, of course, also increased in direct proportion to the increase in pedal pressure with buildup in spring pressure, so the importance all around of keeping the buildup rate down can be easily appreciated. It is, therefore, the principal object of the present invention to further improve the clutch operation by providing improved spring means for the spring loading having a low (and substantially negligible) buildup rate, so that there is no appreciable increase in pedal pressure in the course of the disengaging movement. If the low-rate spring means, which in this case is a bundle of flat leaf springs, is loaded by arching the same to an extent far enough past the point where the deflection/pressure curve levels off, the present invention provides a further advantage in maintaining substantially constant engaging pressure regardless of wear on the clutch plate facings and accordingly avoids the need for frequent adjustments to compensate for wear.

The packs or bundles of flat leaf springs employed to obtain the advantageous low buildup rate are disposed with their flat planes parallel to the pivotal axis of the release levers and can, therefore, be fulcrumed at their ends in simple elongated recesses provided in the webs of the channel-shaped sheet metal levers and the adjacent portions of their supports, so that the same (or even better) compactness of construction is possible as when conventional coiled compression springs having a high build-up rate are used.

The invention is illustrated in the accompanying drawing, in which—

Fig. 1 is a radial section through a clutch embodying my invention;

Figs. 2 and 3 are similar sections through two other clutches showing modified or alternative designs, in so far as the spring loading means with which my invention deals, are concerned, and Fig. 4 is a deflection/pressure curve showing the characteristics of the leaf spring means employed for spring loading, in accordance with this invention.

Similar reference numerals are applied to corresponding parts throughout the views.

Referring to Fig. 1, the reference numeral 8 is applied to a flywheel mounted in the usual way on the rear end of the engine crank shaft (not shown), whereby to constitute the driving element. A shaft indicated at 9 constitutes the driven element and extends rearwardly into the gear box of the transmission, there being a housing about the flywheel and clutch assembly at the front end of the gear box, as is well known. The clutch comprises a disk 10 carried on a hub splined on the front end of the shaft 9, in the usual way, and a pressure plate 11 arranged to engage the disk 10 with the flywheel 8. In the conventional clutch, a plurality of springs are provided acting between the pressure plate and a back plate bolted onto the rim of the flywheel normally to keep the clutch firmly engaged, and levers are provided acting between the pressure plate and the back plate to disengage the clutch against the action of the springs. In the clutch shown in Patent 1,985,301, however, a plurality of levers 12, usually referred to as "release" levers, because they are arranged to be operated by depression of the foot pedal to release the clutch, are mounted in channel shaped supports or brackets 13 provided in circumferentially spaced relation on a back plate 13′ fastened to the back of the flywheel 8, and have springs 14 acting between the brackets 13 and the levers 12 to urge the levers 12 in the proper direction to apply pressure to the pressure plate 11 to frictionally engage the disk 10 between the pressure plate and flywheel. The usual pads or facings 15 are provided on the opposite sides of the disk around the margins thereof to give the desired engagement between the disk 10 and the face on the flywheel, and between the disk 10 and the face on the pressure plate. Each lever 12 is pivoted near its outer end 16 on the bracket 13, as at 17, and the spring 14 is disposed so as to be active against the lever in spaced relation to its inner end 18, whereby to secure the desired pressure multiplication and make for more positive engagement of the clutch. While the pressure of the springs is multiplied through the levers, it is nevertheless apparent that there is a certain mechanical advantage in the disengagement of the clutch, so far as the compression of the springs 14 by means of the levers 12 is concerned, the levers being operated from their inner ends 18 by means of the usual throwout collar by depression of the clutch pedal. The mechanical advantage means lighter pedal action. The operation of the levers 12 in disengagement of the clutch simply results in the compression of the springs 14 between the brackets 13 and the levers 12, leaving the pressure plate 11 free to move away from the flywheel so as not to transmit drive any longer to the clutch disk 10. Another advantage of this location of the springs with respect to the pivots for the levers is that it means very little loss of spring pressure when the clutch facings 15 become worn, whereas if the springs were disposed at the inner ends of the levers there would be appreciable expansion of the springs resulting from the slight wear of the clutch facings, and consequently considerable loss of spring pressure. This much, generally speaking, is old and was covered in our previous Patent 1,985,301, but in that patent coiled compression springs were disclosed for spring loading of the clutch whereas here I have disclosed a leaf spring bundle at 14 for novel spring loading characteristics, as hereinafter more particularly pointed out.

A set screw 19 is threaded in the pressure plate 11 adjacent the outer end 16 of each of the levers 12 and has the head end thereof disposed for engagement by the end of the lever, as shown, whereby to transmit pressure to the plate for the engagement of the clutch. It will be observed that a lock nut 20 is provided in connection with each of these screws to jam against the back of the pressure plate and thus hold the screw in adjusted condition. These set screws 19 are received in radially projecting lugs 21 formed on the pressure plate 11 and projecting through slots 22 provided therefor in the brackets 13. In that way, the brackets 13 transmit drive to the pressure plate 11. A spring clip 23 is provided in connection with each of the levers 12 and the associated drive lugs 21 to retract the pressure plate more or less positively upon each disengagement of the clutch, as disclosed, for example, in my copending application, Serial No. 244,174, filed August 29, 1951, the clips being generally L-shaped and providing an attaching base portion 24 through which the set screw 19 extends and against which the lock nut 20 is arranged to be tightened to clamp the clip in place, the other leg of the L being extended through a slot 25 in the lever 12 and having a hook 26 formed on the end thereof that engages the back of the outer end portion 16 of the lever 12 to transmit a rearward pull on the pressure plate to retract it when the inner end 18 of the lever 12 is moved forward to disengage the clutch. The last mentioned features form a part of what has been covered in the copending application.

Each spring 14 in accordance with my present invention, is in the form of a bundle of three leaf springs 27 of approximately the length and thickness shown and about one inch width, suitably tied together at their ends by cleats 28 and 29 that are preferably about as long as the leaf springs are wide. These cleats are all generally triangular in cross-section and grooved, as at 30, in the base portion of the triangle for reception of the ends of the leaf springs, the more or less pointed apex portion serving as a fulcrum. The one cleat 28 has its apex fulcrum portion received rockingly and with low friction in an elongated depression 31 provided therefor in the back plate 13', and the other cleat 29 has its apex fulcrum portion rockingly engaged with low friction in an elongated recess 32 provided therefor in the web portion 33 of the generally channel shaped sheet metal lever 12 at a predetermined distance from the pivot 17 and also a predetermined distance from the foot pedal operated end 18 of the lever. The engagement of the spring 14 inside the channel of the lever 12 makes possible the same (or even better) compactness of construction with this invention as when conventional coiled compression springs having a high build-up rate are used. The spring 14 is arched, that is, compressed or deflected endwise, so that, in terms of the curve 34 of Fig. 4, it is loaded far enough beyond the bend 35 in the curve in the leveling off portion 36, so that these two advantages are gained:

(1) There is no appreciable increase in pedal pressure in the course of the disengaging movement of lever 12, and (2) There is substantially constant engaging pressure exerted by the pressure plate 11 regardless of an appreciable amount of wear on the clutch plate facings 15.

As a result of (1) the wear and tear on the throwout bearing is reduced, and as a result of (2) there is avoided the need for as frequent adjustments of the set screws 19 to compensate for wear of the facings 15.

In the design shown in Fig. 1 the spring bundle 14 is disposed in acute angular relationship to the lever 12 in order that a fairly long spring 14 may be used with at least as small, if not smaller, fore and aft dimension of the clutch as was required where coiled compression springs were used, as illustrated in Fig. 2 of the aforementioned Patent No. 1,985,301. If a leaf spring bundle like that indicated at 14' in Fig. 2 is employed, where the leaf springs 27' are somewhat shorter, the portion 32' of the lever 12' has to project much farther than the portion 32 of lever 12 in Fig. 1 and hence the overall dimension of the clutch is greater. On the other hand, if the leaf spring bundle is made as shown at 14a in Fig. 3, wherein the leaf springs are much shorter, the same spring loading may be obtained using only two leaf springs 27a in each bundle, and the overall dimension of the clutch compares favorably with that of Fig. 1, because the portion 32a of the lever 12a providing the fulcrum recess need not be so deep. Two leaf springs will suffice to give the desired load under these conditions, as compared with three in the designs shown in Figs. 1 and 2.

It is believed the foregoing description conveys a good understanding of the objects and advantages of my invention. The appended claims have been drawn to cover all legitimate modifications and adaptations.

I claim:

1. In a clutch comprising in combination driving and driven members having surfaces adapted to engage one another, a pressure member for causing such engagement, a plurality of pressure transmitting levers each pivotally supported near the outer end thereof which is arranged to transmit pressure to the pressure member, each of said levers being engaged by a separate spring means individual thereto acting between the pivot and the inner end of said lever at such a distance from the pivot that the pressure of the spring means is multiplied in the action of the lever on the pressure member, said lever being movable manually in the other direction at its inner end at a point farther removed from the pivot than the aforesaid spring means, whereby to secure mechanical advantage in relieving the spring pressure from the pressure member, the improvement which consists in providing each of said spring means of a compressible type having the same low build-up rate in that range of the compression thereof involved in the operation of the clutch.

2. In a clutch comprising in combination driving and driven members having surfaces adapted to engage one another, a pressure member for causing such engagement, a plurality of pressure transmitting levers each pivotally supported near the outer end thereof which is arranged to transmit pressure to the pressure member, each of said levers being engaged by a separate spring means individual thereto acting between the pivot and the inner end of said lever at such a distance from the pivot that the pressure of the spring means is multiplied in the action of the lever on the pressure member, said lever being movable manually in the other direction at its inner end at a point farther removed from the pivot than the aforesaid spring means, whereby to secure mechanical advantage in relieving the spring pressure from the pressure member, the improvement which consists in providing each of said spring means of a compressible type having the same low build-up rate in the range of compression incident to clutch disengaging movement of the lever, whereby to enable disengagement of the clutch with less manual effort.

3. In a clutch comprising in combination driving and driven members having surfaces adapted to engage one another, a pressure member for causing such egagement, a plurality of pressure transmitting levers each pivotally supported near the outer end thereof which is arranged to transmit pressure to the pressure member, each of said levers being engaged by a separate spring means individual thereto acting between the pivot and the inner end of said lever at such a distance from the pivot that the pressure of the spring means is multiplied in the action of the lever on the pressure member, said lever being movable manually in the other direction at its inner end at a point farther removed from the pivot than the aforesaid spring means, whereby to secure mechanical advantage in relieving the spring pressure from the pressure member, the improvement which consists in providing each of said spring means of a compressible type having the same low build-up rate in and also below the range of compression incident to clutch disengaging movement of the lever, whereby to enable disengagement of the clutch with less manual effort, and also provide more nearly constant engaging spring pressure despite appreciable wear on the engaging surfaces.

4. In a clutch comprising in combination driving and driven members having surfaces adapted to engage one another, a pressure member for causing such engagement, a plurality of pressure transmitting levers each pivotally supported near the outer end thereof which is arranged to transmit pressure to the pressure member, each of said levers being engaged by a separate spring means individual thereto acting between the pivot and the inner end of said lever at such a distance from the pivot that the pressure of the spring means is multiplied in the action of the lever on the pressure member, said lever being movable manually in the other direction at its inner end at a point farther removed from the pivot than the aforesaid spring means, whereby to secure mechanical advantage in relieving the spring pressure from the pressure member, the improvement which consists in providing for each of said spring means an elongated leaf-spring which is flat when under no load but is compressed endwise to arched form, the compression being to the extent wherein the leaf spring has a low buildup rate, whereby to enable disengagement of the clutch with less manual effort.

5. In a clutch comprising in combination driving and driven members having surfaces adapted to engage one another, a pressure member for causing such engagement, a plurality of pressure transmitting levers each pivotally supported near the outer end thereof which is arranged to transmit pressure to the pressure member, each of said levers being engaged by a separate spring means individual thereto acting between the pivot and the inner end of said lever at such a distance from the pivot that the pressure of the spring means is multiplied in the action of the lever on the pressure member, said lever being movable manually in the other direction at its inner end at a point farther removed from the pivot than the aforesaid spring means, whereby to secure mechanical advantage in relieving the spring pressure from the pressure member, the improvement which consists in providing for each of said spring means an elongated leaf-spring which is flat when under no load but is compressed endwise to arched form, the compression being to the extent wherein the leaf spring has a low buildup rate, whereby to enable disengagement of the clutch with less manual effort, the compression being far enough into the low buildup range that so long as the clutch remains engaged a more nearly constant engaging spring pressure is afforded regardless of appreciable wear on the engaging surfaces.

6. In a friction clutch comprising a flywheel serving as a driving element, and a clutch disk serving as a driven element, a pressure plate for holding the clutch disk frictionally engaged with the flywheel, said plate having a plurality of equally circumferentially spaced drive lugs projecting rearwardly from the periphery thereof, a plurality of brackets mounted on the flywheel and slidably engaged by said lugs whereby to transmit drive from the flywheel to the pressure plate while permitting movement of the latter toward and away from the flywheel, and levers pivotally supported near their outer ends on said brackets so that their outer ends are disposed for engagement with said lugs to transmit pressure to the pressure plate, the improvement which consists in the provision of substantially straight elongated leaf springs individual to said levers and supported in endwise loaded bowed condition by engagement at one end on said brackets and at the other end by engagement on said levers between the pivots therefor and their inner ends, said levers being operable manually at their inner ends, whereby to release the spring pressure from said pressure plate, said springs all having the same low buildup rate at least in the range with which the operation of the clutch is concerned.

7. In a friction clutch comprising a flywheel serving as a driving element, and a clutch disk serving as a driven element, a pressure plate for holding the clutch disk frictionally engaged with the flywheel, said plate having a plurality of equally circumferentially spaced drive lugs projecting rearwardly from the periphery thereof, a plurality of brackets mounted on the flywheel and slidably engaged by said lugs whereby to transmit drive from the flywheel to the pressure plate while permitting movement of the latter toward and away from the flywheel, and levers pivotally supported near their outer ends on said brackets so that their outer ends are disposed for engagement with said lugs to transmit pressure to the pressure plate, the improvement which consists in the provision of bundles of substantially straight elongated leaf springs, there being one of said bundles individual to each of said levers, each bundle being in endwise loaded condition with the springs bowed and supported at one end by engagement on said brackets and at the other end by engagement on said levers between the pivots therefor and their inner ends, said levers being operable manually at their inner ends, whereby to release the spring pressure from said pressure plate, said springs all having the same low buildup rate in that loading that is incident to manual operation of the levers for disengagement of the clutch.

8. In a friction clutch comprising a flywheel serving as a driving element, and a clutch disk serving as a driven element, a pressure plate for holding the clutch disk frictionally engaged with the flywheel, said plate having a plurality of equally circumferentially spaced drive lugs projecting rearwardly from the periphery thereof, a plurality of brackets mounted on the flywheel and slidably engaged by said lugs whereby to transmit drive from the flywheel to the pressure plate while permitting movement of the latter toward and away from the flywheel, levers pivotally supported near their outer ends on said brackets so that their outer ends are disposed for engagement with said lugs to transmit pressure to the pressure plate, and screw adjustments for changing the operative relationship between said lugs and the ends of said levers, the improvement which consists in the provision of substantially straight elongated leaf springs, individual to said levers, supported in loaded endwise bowed condition by engagement at one end on said brackets and at the other end by engagement on said levers between the pivots therefor and their inner ends, said levers being operable manually at their inner ends, whereby to release the spring pressure from said pressure plate, said springs all having the same low buildup rate in and below that loading that is incident to manual operation of the levers for disengagement of the clutch, the low buildup rate below the loading incident to disengagement of the clutch being beneficial in providing more nearly constant engaging spring pressure despite appreciable wear on the clutch disk and accordingly reducing the necessity for as many adjustments of the screw adjustments to compensate for such wear.

9. In a friction clutch comprising a flywheel serving as a driving element, and a clutch disk serving as a driven element, a pressure plate for holding the clutch disk frictionally engaged with the flywheel, said plate having a plurality of equally circumferentially spaced drive lugs projecting rearwardly from the periphery thereof, a plurality of brackets mounted on the flywheel and slidably engaged by said lugs whereby to transmit drive from the flywheel to the pressure plate while permitting movement of the latter toward and away from the flywheel, levers pivotally supported near their outer ends on said brackets so that their outer ends are disposed for engagement with said lugs to transmit pressure to the pressure plate, and springs supported on said brackets and engaging said levers between the pivots therefor and their inner ends, said levers being operable manually at their inner ends, whereby to release the spring pressure from said pressure plate, the improvement which consists in providing each of said springs of a normally straight elongated leaf-spring form that is compressed endwise to arched form and supported at its ends on low friction fulcrums, the compression being to the extent wherein the leaf spring has a low buildup rate, whereby to enable disengagement of the clutch with less manual effort.

10. In a friction clutch comprising a flywheel serving as a driving element, and a clutch disk serving as a driven element, a pressure plate for holding the clutch disk frictionally engaged with the flywheel, said plate having a plurality of equally circumferentially spaced drive lugs projecting rearwardly from the periphery thereof, a plurality of brackets mounted on the flywheel and slidably engaged by said lugs whereby to transmit drive from the flywheel to the pressure plate while permitting movement of the latter toward and away from the flywheel, levers pivotally supported near their outer ends on said brackets so that their outer ends are disposed for engagement with said lugs to transmit pressure to the pressure plate, screw adjustments for changing the operative relationship between said lugs and the ends of said levers, and springs supported on said brackets and engaging said levers between the pivots therefor and their inner ends, said levers being operable manually at their inner ends, whereby to release the spring pressure from said pressure plate, the improvement which consists in providing each of said springs of a normally straight elongated leaf-spring form that is compressed endwise to arched form and supported at it sends on low-friction fulcrums, the compression being to the extent wherein the leaf spring has a low buildup rate, whereby to enable disengagement of the clutch with less manual effort, the compression being far enough into the low buildup range that so long as the clutch remains engaged a more nearly constant engaging spring pressure is afforded regardless of appreciable wear on the clutch disk whereby less frequent adjustments of the screw adjustments are necessary.

References Cited in the file of this patent

UNITED STATES PATENTS

| | | |
|---|---|---|
| 1,780,222 | Bullard et al. | Nov. 4, 1930 |
| 1,985,301 | Thelander et al. | Dec. 25, 1934 |
| 2,045,557 | Almen et al. | June 23, 1936 |
| 2,214,780 | Thelander | Sept. 17, 1940 |
| 2,277,221 | Gamble | Mar. 24, 1942 |
| 2,325,193 | Nutt et al. | July 27, 1943 |
| 2,540,463 | Spase | Feb. 6, 1951 |

FOREIGN PATENTS

| | | |
|---|---|---|
| 122,250 | Great Britain | Jan. 17, 1919 |